UNITED STATES PATENT OFFICE.

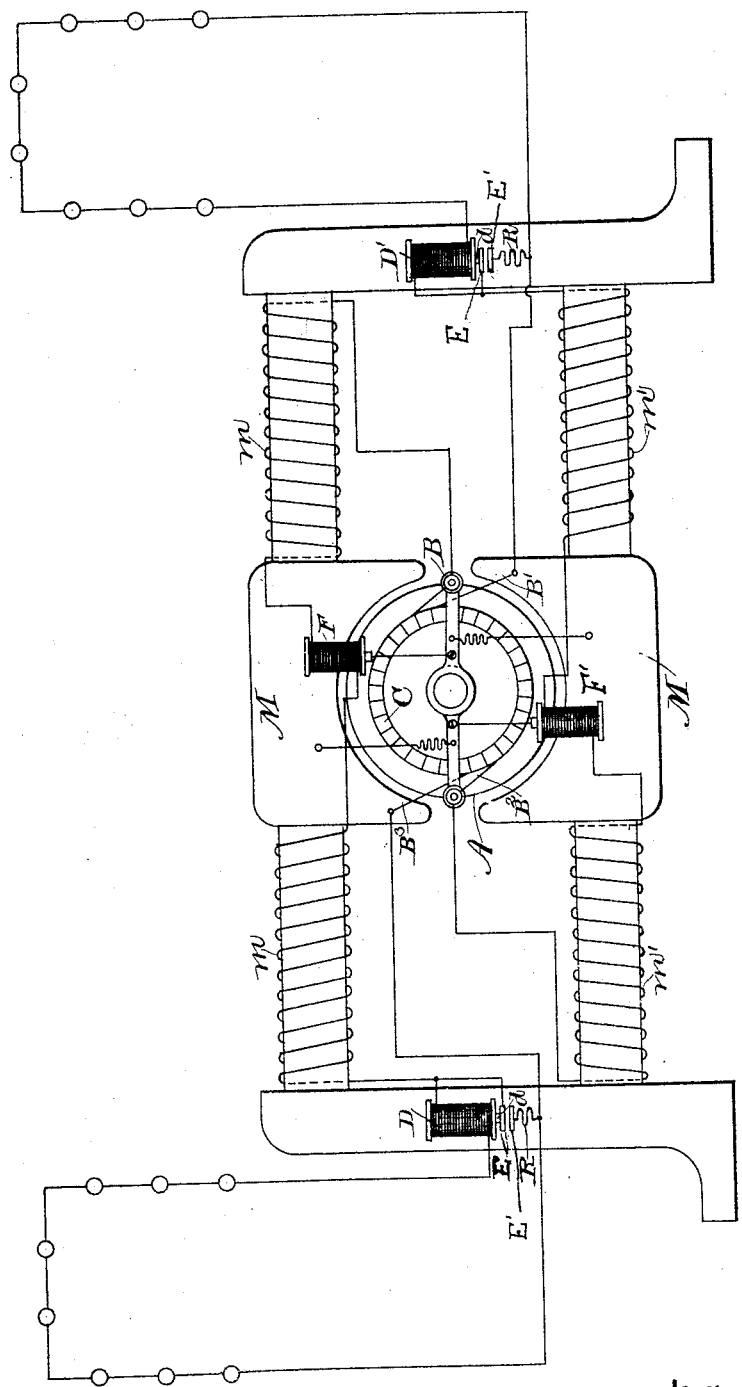

WILLIAM H. ELKINS, OF CAMBRIDGE, MASSACHUSETTS, ASSIGNOR TO THE THOMSON-HOUSTON ELECTRIC COMPANY, OF CONNECTICUT.

REGULATOR FOR DYNAMO-ELECTRIC MACHINES.

SPECIFICATION forming part of Letters Patent No. 501,059, dated July 11, 1893.

Application filed June 23, 1892. Serial No. 437,785. (No model.)

*To all whom it may concern:*

Be it known that I, WILLIAM HENRY ELKINS, a citizen of the United States, residing at Cambridge, in the county of Middlesex and State of Massachusetts, have invented certain new and useful Improvements in Dynamo-Electric Machines, of which the following is a specification.

This invention relates to improvements in dynamo electric machines, more particularly to machines arranged to feed two separate circuits from the same commutator. A machine of this kind has been devised by me wherein there are two sets of commutator-brushes connected respectively, through different portions of the field coil to two separate circuits containing, for example, arc lamps in series. By making one brush of each set adjustable, under the control of an electro-magnetic device in the corresponding circuit, it has been found possible to provide for the regulation of each circuit independently of the other. But in case one of the circuits becomes entirely interrupted, the difficulty occurs that the field coil is greatly weakened, and the electro-motive force and current on the other circuit correspondingly reduced. To prevent this result is the object of my present invention, which consists in a switch, preferably automatic, which, when one of the circuits is interrupted, is or may be placed in position to shunt said circuit, preferably through a resistance, thereby maintaining the field magnetism.

The accompanying drawing shows in elevation, a machine of the character above described, having my invention applied thereto, together with a diagram of the circuits and connections.

The dynamo electric machine to which my invention is applied, has two sets of field coils $m$, $m'$ on its field magnet M, and its armature A has the usual commutator C on which bear two pairs or sets of brushes B, B', B², B³. One brush, as B', B³ of each pair, is preferably fixed, the other is adjustable around the commutator, its adjustment being controlled by an electro-magnetic device F or F', having its coil placed in a circuit including the brush it controls, one set of field coils and one of the external or work circuits. With this construction and arrangement the fluctuations in each circuit are independently compensated for by the regulating action of the brush shifting devices. In each of these independent circuits I provide a switching device, whose contacts E E', &c., when closed complete a shunt around that circuit, said shunt preferably including a resistance R. Said switching devices are preferably operated automatically on cessation of current in either of the circuits to shunt the same so as to maintain the field magnetism. This I accomplish by an electro-magnetic device D or D' having its coils located in the connections to the external circuit, and having an armature or core $d$, controlling the switch contacts, so that when current ceases in either of the external circuits, the electro-magnetic device releases its armature, the contacts are allowed to come together under the influence of a suitable retractor, in this case, the weight of the core, and a circuit is formed for the corresponding set of brushes and field coils, independently of the external circuit, and shunting the same.

The switching devices may be reset by hand, but the resistance R may be, and in practice would be, sufficient to deflect enough current through the magnet to cause it to draw up its armature and reset the contacts as soon as the continuity of the working or external circuit was once more completed.

What I claim as new, and desire to secure by Letters Patent, is—

1. The combination with a dynamo electric machine having two sets of brushes bearing on its commutator and two working circuits connected respectively to such sets of brushes, and each having connections to the field coils, of a shunting switch for each of such circuits.

2. The combination with a dynamo electric machine having two sets of brushes bearing on its commutator with independent brush shifting devices for such sets of brushes, of two working circuits connected respectively to such sets of brushes, and each having connections to the field coils, and a shunting switch for each of such circuits.

3. The combination with a dynamo electric machine having two sets of field coils, of two work circuits connected respectively thereto and having independent current regulating devices, and a shunting switch for each work circuit.

4. The combination with a dynamo electric machine having two sets of brushes on its commutator and two sets of field coils, of two work circuits, each connected with one of the field coils and sets of brushes, and each having brush-shifting devices and shunting devices controlled by magnets in connection with the respective circuits.

5. The combination with a dynamo electric machine having two sets of commutator brushes and two sets of field coils, of independent brush-shifting devices, electro-magnets controlling the same included respectively in circuit with corresponding brushes and field coils, and two work circuits connected respectively to the two sets of brushes and field coils, each having a shunting switch and including an electro-magnet controlling said switch.

6. The combination with a dynamo electric machine having two sets of brushes, of two work circuits, each connected with the field coils and one of the sets of brushes, independent regulating devices for each circuit, a shunting connection for each circuit, a resistance and a switch in such connection and a magnet in each circuit controlling said switch.

In witness whereof I have hereunto set my hand this 11th day of June, 1892.

W. H. ELKINS.

Witnesses:
N. F. HAYES,
H. J. LIVERMORE.